Aug. 5, 1947.     P. K. OZINGA     2,425,202
APPARATUS FOR COMPLETING WELLS
Filed Jan. 12, 1943     3 Sheets-Sheet 1

Inventor: Peter K. Ozinga
By his Attorney:

Patented Aug. 5, 1947

2,425,202

UNITED STATES PATENT OFFICE 2,425,202

APPARATUS FOR COMPLETING WELLS

Peter K. Ozinga, Houston, Tex., assignor to Shell Development Company, San Francisco, Calif., a corporation of Delaware Application January 12, 1943, Serial No. 472,143

2 Claims. (Cl. 166—1)

This invention relates to the completion of oil, gas and water wells, and pertains more particularly to an apparatus for completing wells wherein a screen is run into the well as a part of a combination casing string to be cemented or otherwise sealed in the well.

After a screen has been set in the sand, and before the well is put on production, it is essential that the screen be thoroughly washed outside to remove from the outside of the screen proper, from the annular space formed by the outside of the screen and the walls of the borehole, and from the walls of the borehole itself any mud, debris and other obstructive material which may otherwise clog the screen perforations and impede the in-flow of oil, gas or water. It is, furthermore, highly desirable that, when a fine mesh screen is used in the well, the above-mentioned mud, debris and other obstructive material should be removed from behind the screen and brought to the surface without having to pass through any perforations of the screen proper, as damage and serious clogging of the screen will otherwise result from the washing operation itself.

Washing the outside of liner screens lowered through the casing has hitherto met with considerable difficulties, chiefly due to the necessity of maintaining a pressure control on the well during the washing operation. No satisfactory method has been devised to wash the outside of screens forming part of a cemented casing string.

It is, therefore, an object of this invention to provide an apparatus for completing wells by setting and cementing therein a combination string comprising a screen forming a part of said string and having the same or a larger diameter than said string.

It is also the object of this invention to provide an apparatus for completing of wells wherein a casing string, comprising a screen section, is cemented above said screen, and the screen is subsequently washed on the outside to remove mud, debris and other obstructive material without passing the washing fluid or the mud, debris and other obstructive material through any opening of the screen proper.

It is also the object of this invention to provide an apparatus for completing of wells wherein a casing string comprising a screen section is cemented above said screen, and the screen is subsequently washed on the outside in such a manner that the washing fluid will have a downward or gravity direction.

It is also the object of this invention to provide an apparatus for completing wells wherein a casing string comprising a screen section is cemented above said screen and, through a sudden reduction of the hydrostatic pressure on the sand, the well is cleared through the tubing, of mud, debris or other obstructive material without this mud, debris or other obstructive material being passed through any opening of the screen proper.

It is also an object of this invention to provide an apparatus for completing wells, wherein a casing string, comprising a screen section, is cemented above said screen, and the screen is subsequently washed on the inside and the outside without releasing pressure, whereby the possibility of the well getting out of control during the washing operation is eliminated.

It is also an object of this invention to provide, for the completion of wells, a system comprising a casing string having a screen section, and a tubing string adapted to be lowered within said casing string and comprising packer and flow control elements, said two strings being adapted to cooperate with each other in effecting the washing of the screen without releasing the pressure on the well and in such a manner that no rotational operations of the tubing string are required to carry out the various steps of the washing process, whereby the hazards attendant such rotational operations are eliminated, and no swivel connection at the top of the tubing string is necessary.

These and other objects of this invention will be understood from the following description, taken with reference to the attached drawings, wherein.

Figure 1:
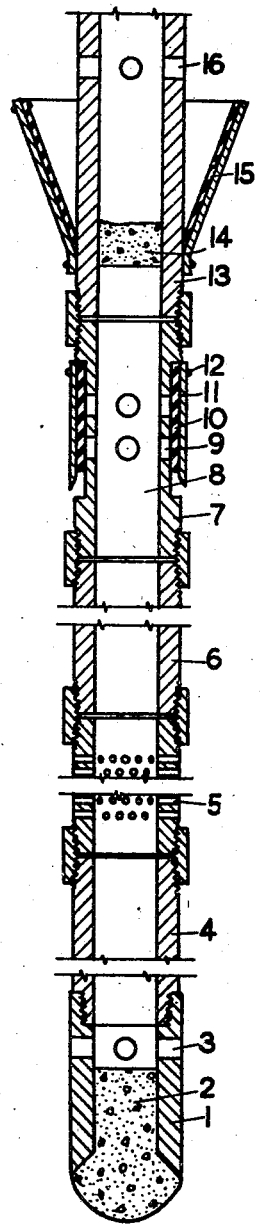
Fig. 1 is a diagrammatic cross-section view of the combination casing string forming a part of the present invention.

The casing string, shown in Fig. 1, carries at its lower end a bull plug shoe 1, having a drillable cement plug 2, and a plurality of perforations 3 drilled in said shoe just above the cement plug. Connected into the casing string above the shoe 1 and a blank nipple 4 (or a plurality of such nipples), is a screen 5, which is of any desired type, and is adapted to be installed opposite the producing formation when the casing string is cemented in the borehole.

Forming the casing string above the screen 5 is a blank nipple or nipples 6, and a cementing collar 8. This collar, however, is used according to the present invention for circulation, and not for cementing purposes, and is therefore connected into the string in a position inverse to that in which such collars are normally used for cementing.

As seen from Fig. 1, this collar comprises nipple 7, having perforations 9. Surrounding the perforated nipple 7 is an outside sleeve 10, made of oil-resistant rubber or other suitable, preferably resilient, material. This sleeve is pressed against the perforations 9 by resilient spring members 11, which are affixed to the nipple or casing near the upper end of the collar 8, as shown at 12. In this manner, when the pressure within the casing exceeds that outside the casing, the fluid forced through the perforations 9 acts to lift the sleeve 10, and is then directed downward by said downwardly flaring sleeve and springs.

Connected into the casing string above the collar 8 is a cementing nipple 13, having an expanding cementing basket 14 attached thereto. The nipple 13 is also provided with a solid baffle plate 14, made of cement or other suitable frangible or drillable material, and with cementing orifices 16. The casing string extends to the surface above the element 13.

Figure 4:
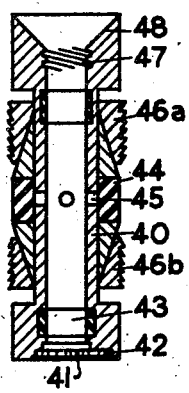
Fig. 4 is a diagrammatic cross-section view of a production retainer packer adapted to be anchored within the casing string of Fig. 1.

Adapted to be set in the nipple 4 of the composite string is a production retainer packer shown in detail in Fig. 4 such, for example, as the Baker Production Retainer Packer No. 415-B, shown on page 265 of the Composite Catalog of Oil Field and Pipeline Equipment for 1942.

This production retainer packer comprises, briefly, a tubular member 40, having therethrough a bore 43, provided at its lower end with a flapper valve 41, actuated into closing position by a spring 42.

The bore 43 has screw-threads 47 for engagement with a setting tool by means of which the retainer packer may be lowered into the casing, and a flaring upper end 48.

The production retainer packer carries therearound a resilient packing element 44, and sets of grips 46a and 46b by means of which it may be anchored within the nipple 4, for example, by the application of fluid pressure to the packer element 44 through the ports 45 and by subsequent raising of the running-in string, in a manner well known in the art.

Figure 2:
Fig. 2 is a diagrammatic view, partly in cross-section, of the tubing string forming a part of the present invention.

The tubing string adapted to be lowered within the above composite casing string comprises a desired length of tubing generally shown at 25 in Fig. 2. The tubing string terminates at its lower end with a perforated wash nipple 21. A packing sub 23, which is a tubular member of a diameter somewhat larger than the tubing string, is inserted thereinto above the nipple 21. The sub 23 has a tapered face provided with a resilient packer inset element 22, which is adapted to seat in, and to form a fluidtight seal with the flaring bore 48 of the retainer packer shown in Fig. 4 when said retainer is anchored within the casing nipple 4 of Fig. 1.

Mounted on the tubing string and adapted to be expanded within the nipple 6 of the casing, is a packer 24, such as a conventional anchor-type or open-hole type packer such, for example, as an open hole or dual packer of the M. O. Johnston Field Service Corporation, or the anchor type formation packer of the Lane-Wells Company, as shown on pages 1293 and 1380, respectively, of the Composite Catalog of Oil Field and Pipeline Equipment for 1942.

Mounted above the packer 24 at such distance as to be positioned approximately within or below the collar 8 when the packer 24 is expanded within the nipple 6, is a circulating valve 30, shown in more detail in Fig. 3.

The circulating valve comprises a tubular member 30 screw-threadedly connected into the tubing string 25 by means of the upper and the lower end members 31a and 31b.

A tubular member 32 has an enlarged diameter head 37, fitting slidably within the member 30. The bore through the members 32 and 37 has a flaring upper end forming a constriction or seat 38 for a sealing element, such as a ball 39, which may be dropped or pumped from the surface through the tubing 25.

The head 37 is held in abutment against the upper end member 31a of the valve by a spring 33, surrounding the tubular member 32 and compressed between the lower end member 31b and a stop member 34, screw-threadedly or otherwise attached to the tubular member 32. A packing ring 36 is held between the head 37 and the stop member 34, and normally closes the lateral ports or orifices 35 through the valve housing 30. Both the stop member 34 and the packing 36 are adapted for a sliding fit within said housing.

It will be seen that when a fluid is pumped down the tubing 25, it passes freely through the bore in the member 37—32 to the tubing below the circulation valve. When, however, a ball 39 is dropped into the tubing 25, and is pumped down until it reaches the seat 38, said bore becomes sealed, and the pressure developing in the upper portion of the tubing 25 forces the tubular member 37—32 downwards against the action of the spring, together with the ball 39, packing 36 and stop member 34, thus opening the lateral ports 35 and permitting circulation of the fluid from the inside to the outside of the tubing 25 through the ports 35.

The operations of completing a well by cementing therein the composite casing string of Fig. 1, and of washing the screen 5 on the inside and outside preliminary to putting the well on production, are effected by means of the apparatus described above in the following manner.

The combination casing string is made up as shown in Fig. 1 and run into the borehole in the usual manner. With the shoe 1 about 3 feet above the bottom, the string is cemented by pumping a cementing mixture into the string and forcing it out of the orifices 16. The baffle plate 14 and the cementing basket 15 prevent the cement from penetrating below the desired level within the casing or in the annular space between the casing and the walls of the borehole, respectively.

It will be noted that during the process of lowering the section of the casing string below the solid baffle plate into the drilling fluid filling the borehole, said fluid will enter the casing string through the openings 3 in the casing shoe and thus the tendency to mud clog the screen is reduced. The screen may be further protected from mudding up by applying thereto, both outside and inside, a protective coating of grease or other material, which is subsequently easily removed during the washing process and the initial period of the production operations.

Figure 5:
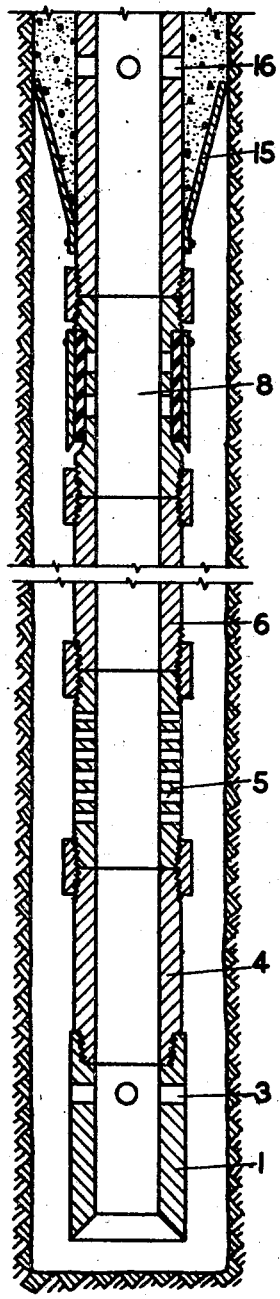
Figs. 5–10 are diagrammatic sketches illustrating successive steps in the present well-completing method.

The baffle plate 14 (as well as any travelling cementing plugs which may have been pumped down the string together with the cement) and the cement plug 2 in the shoe 1 are then drilled out by lowering a drill string and bit within the casing, and the hole is cleaned out to the bottom by circulation through said drill string, care being taken that any fluid remaining in the well is clean and in good condition. The drill string is withdrawn and the well is then in the condition indicated in Fig. 5.

Figure 6:
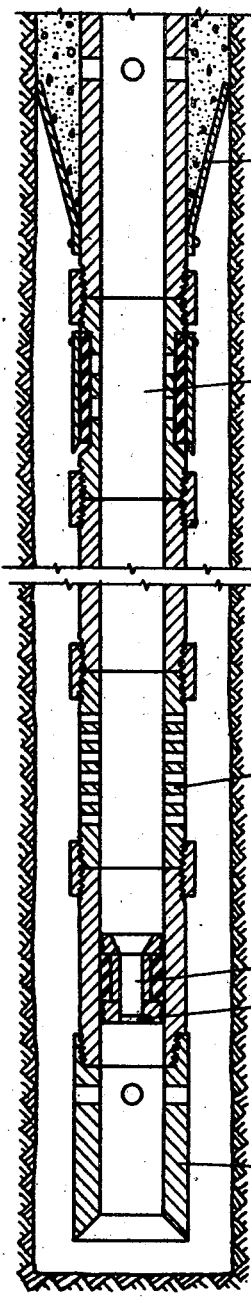

The production retainer packer is now run in the well and anchored within the nipple 4 by means of a drill pipe or tubing string with a special setting tool, which string is subsequently withdrawn, as shown in Fig. 6.

The tubing string is then made up as shown in Fig. 2 and is lowered within the casing. After a few tubing stands have been run in, a Christmas tree of a suitable type may be connected and flanged up to the casing head.

Figure 7:
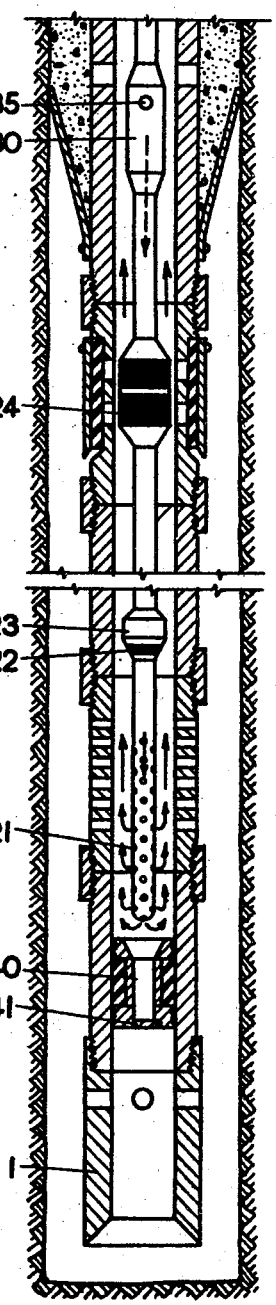

After the tubing string has been lowered to a point near, but above, the top of the retainer packer 40, the mud circulating pumps are started at the surface and circulation is established through the perforated nipple 21 as shown by arrows in Figure 7.

Figure 3:
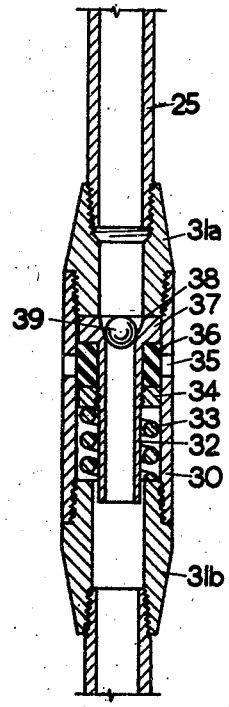
Fig. 3 is a diagrammatic cross-section view of the circulating valve connected into the tubing string of Fig. 2.

Just before lowering the perforated nipple 21 through the flapper valve 41 of the production retainer packer 40, the bridging ball 39, shown in Fig. 3, is dropped into the tubing string, which causes the circulating valve 30 to stop downward fluid flow past said valve, and to open circulation through the windows 35 of said valve, as explained hereinabove with regard to Fig. 3. At this time the circulating pumps may be temporarily stopped.

Figure 8:
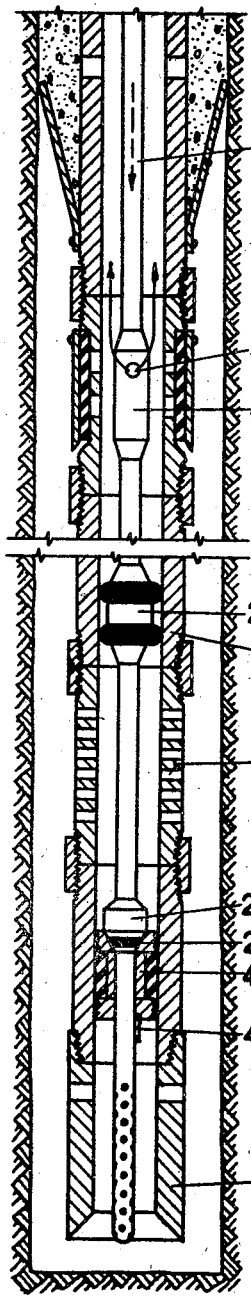

The tubing string is now lowered further, the perforated nipple 21 opening the flapper valve 41 of the production retainer packer 40, and the packing 22 of the sub 23 seating in fluid-tight manner in the flared bore of said retainer packer, as shown in Figure 8.

The anchor packer 24 is now set in the casing nipple 6 by slacking the tubing string, or in any other desirable manner well known in production operations.

The circulating pumps are started again, now pumping the washing fluid down the tubing, the ball 39 still sealing the seat of the circulation valve 30, and circulation being therefore effected down the tubing 25 and up within the casing above the anchor packer 24, until all the mud in the casing above said packer is circulated out.

During this stage of the process, the hydrostatic pressure on the sand and the conditions below the anchor packer 24 and behind the screen 5 remain unchanged, since no movement of the fluid trapped there is permitted. The possibility of the well coming in at this time is thus eliminated.

After all the mud above the anchor packer 24 has been circulated out, the pumps are again stopped, the valve closing the tubing string at the surface is temporarily shut to prevent backflow, and the pump connections are changed for reverse circulation.

Figure 9:
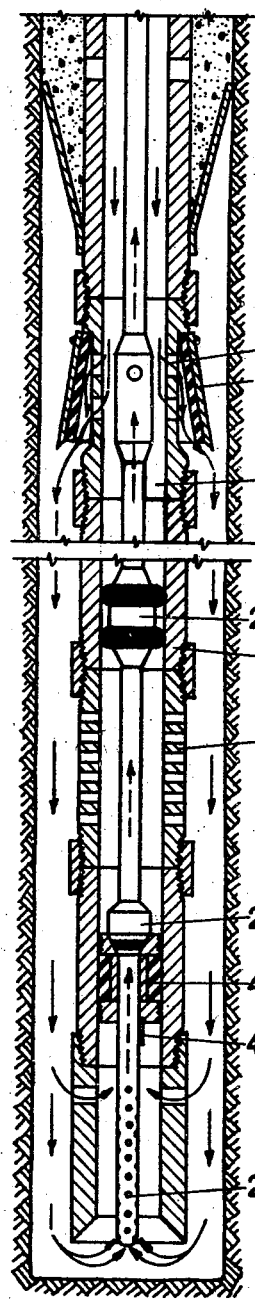

During this step of the process, which is shown in Fig. 9, the washing of the screen is effected by pumping the washing fluid down the casing and up the tubing string. Since the casing string is closed by the anchor packer 24 expanded within the nipple 6, the rise in pressure caused thereby forces the outside sleeve 10 of the cementing collar 8 away from the windows 9, and the flow of the liquid is effected through said windows down the annular space between the casing and the walls of the borehole, the liquid flowing past the screen 5 effectively washing this screen from the outside.

As shown by the arrows in Fig. 9, the washing liquid flows down the borehole to the end of the string and enters the tubing through the perforated nipple 21, after which it travels up the tubing, lifting the ball 39 in the circulation valve 30 and bringing it to the surface. The circulating liquid can, if necessary, be kept under back pressure to prevent the well from coming in.

Figure 10:
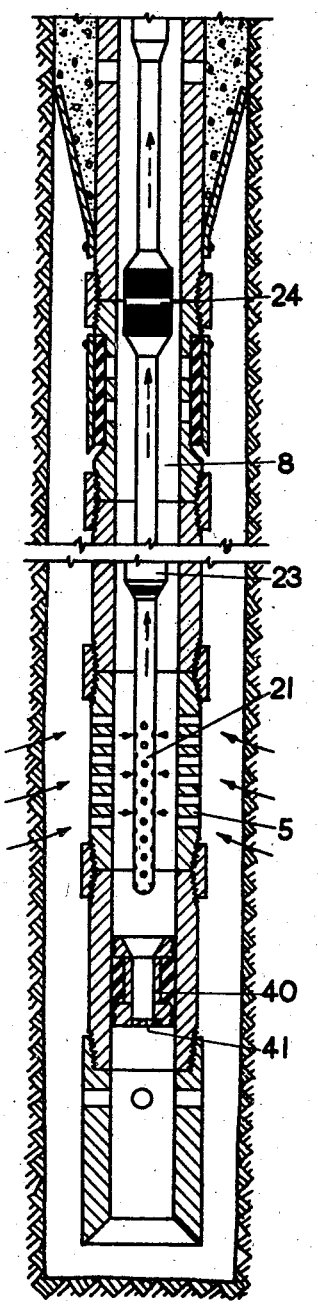

The tubing is now raised, if necessary, under pressure, as shown in Figure 10, after releasing the anchor packer 24 and unseating the sub 23 from the production retainer packer 40, the flapper valve 41 closing said retainer after the perforated nipple 21 is removed therefrom.

The tubing is then landed by using the conventional apparatus required for this purpose, such as drop-in back-pressure valves and tubing hangers, and the well is ready to be put on production through the screen 5 and the tubing 21.

It is obvious that although the above washing process has been described with regard to screens directly connected into a casing string, it is equally well applicable to screens or perforated pipe run into the well in the form of a liner.

It may be remarked that washing the outside of a screen set in a hole of large diameter with the washing fluid having an upward direction may be ineffective as the velocity of the washing fluid is reduced to such extent by the large diameter of the hole that mud, debris and other obstructive material cannot be raised to the surface by the washing fluid. If, however, the washing is carried out by reversed circulation or in gravity direction, such mud, debris, or other obstructive material will gravitate down to the perforations in the washing nipple 21 and will be carried to the surface by the high velocity upward flow of the washing fluid inside the tubing.

I claim as my invention:

1. For use in completing wells, the combination comprising a first tubular string, means thereon for cementing said string in a well, radial windows in said string below said cementing means, yieldable closure means normally closing said windows, said closure means being adapted to open to permit an outward flow in response to fluid pressure within said string, a screen connected into said string below said windows, a second tubular string removably positioned in said first string with the lower ends of said first and second strings at substantially the same level, and upper and lower packing means carried by said second tubular string sealing the annular space between the two strings at points respectively below and above said screen, said first and second strings being open to the well below said lower packing means, whereby a washing fluid can be circulated downwardly past the outer face of said screen and upwardly through said second string out of contact with said screen.

2. For use in completing wells, the combination comprising a first tubular string, means thereon for cementing said string in a well, radial windows in said string below said cementing means, yieldable closure means normally closing said windows, said closure means being adapted to open to permit an outward flow in response to fluid pressure within said string, a screen connected into said string below said windows, a flow-restricting member carried within said string below said screen, said member having an axial opening therethrough, a second tubular string removably positioned in said first string with the lower portion of said second string extending through said flow restricting member, lower packer means carried by said second string sealing the space between the two strings by seating on said flow restricting member when the second string is so positioned, expansible upper packer means carried by said second string sealing the annular space between the two strings above said screen when the second string is so positioned, and a circulation valve in said second string above said upper packer means having a normally open axial passage and normally closed radial ports, said axial passage being adapted to be closed and said ports being adapted to be opened by go-devil means pumped from the surface down said second string, said first and second tubular strings being open to the well below said flow restricting member, whereby a washing fluid can be circulated downwardly past the outer face of said screen and upwardly through said second string out of contact with said screen.

PETER K. OZINGA.

REFERENCES CITED

The following references are of record in the file of this patent:

UNITED STATES PATENTS

| Number | Name | Date |
|---|---|---|
| 1,819,668 | Baker | Aug. 18, 1931 |
| 1,944,443 | Manning | Jan. 23, 1934 |
| 2,275,937 | Baker | Mar. 10, 1942 |
| 2,291,371 | Buchanan et al. | July 28, 1942 |
| 1,956,694 | Parrish | May 1, 1934 |
| 2,189,702 | Burt | Feb. 6, 1940 |
| 2,189,703 | Burt et al. | Feb. 6, 1940 |
| 2,312,018 | Beckman | Feb. 23, 1943 |
| 1,912,578 | Halliburton | June 6, 1933 |
| 2,198,573 | Davis et al. | Apr. 23, 1940 |
| 2,318,167 | Knowlton | May 4, 1943 |
| 1,561,768 | Baker | Nov. 17, 1925 |